United States Patent [19]

Mitry

[11] Patent Number: 5,340,873
[45] Date of Patent: Aug. 23, 1994

[54] TOUGHENED CYANOACRYLATE ADHESIVE COMPOSITION CONTAINING POLYESTER POLYMERS

[75] Inventor: Mark Mitry, Flemington, N.J.

[73] Assignee: National Starch and Chemical Investment Holding Corporation, Wilmington, Del.

[21] Appl. No.: 85,434

[22] Filed: Jun. 30, 1993

Related U.S. Application Data

[63] Continuation of Ser. No. 749,354, Aug. 23, 1991, abandoned.

[51] Int. Cl.$^5$ ............................................. C08G 63/91
[52] U.S. Cl. ............................................. 525/10; 525/35; 525/48; 525/437; 525/445; 528/272; 528/274; 528/302; 528/308; 528/308.6; 528/392
[58] Field of Search ............... 535/10, 35, 48, 437, 535/445; 528/272, 274, 302, 308, 308.6, 392

[56] References Cited

U.S. PATENT DOCUMENTS

| | | | |
|---|---|---|---|
| 3,896,077 | 7/1975 | Leonard et al. | 523/177 |
| 3,993,678 | 11/1976 | Sweeny et al. | 260/465 D |
| 4,102,945 | 7/1978 | Gleave | 260/879 |
| 4,105,571 | 8/1978 | Shaub et al. | 252/32.7 E |
| 4,105,715 | 8/1978 | Gleave | 260/881 |
| 4,130,494 | 12/1978 | Shaub et al. | 252/32.5 |
| 4,170,585 | 10/1979 | Motegi et al. | 260/33.2 R |
| 4,313,865 | 2/1982 | Teramoto et al. | 260/31.4 R |
| 4,377,490 | 3/1983 | Shiraishi et al. | 252/188.3 R |
| 4,378,457 | 3/1983 | Gruber et al. | 526/285 |
| 4,386,193 | 5/1983 | Reich et al. | 526/298 |
| 4,421,909 | 12/1983 | Gruber et al. | 528/362 |
| 4,425,471 | 1/1984 | Millet | 526/298 |
| 4,440,910 | 4/1984 | O'Connor | 525/295 |
| 4,560,723 | 12/1985 | Millet et al. | 524/486 |
| 4,622,414 | 11/1986 | McKervey | 560/61 |
| 4,837,260 | 6/1989 | Sato et al. | 524/261 |
| 4,845,151 | 7/1989 | Sivy | 524/762 |
| 5,034,456 | 7/1991 | Katsumura et al. | 524/850 |

FOREIGN PATENT DOCUMENTS

| | | |
|---|---|---|
| 0194706 | 9/1986 | European Pat. Off. |
| 53-79932 | 6/1978 | Japan |

OTHER PUBLICATIONS

"Organic Polymer Chemistry", K. K. Saunders, Chapman and Hall Ltd., 1973, pp. 203–244.
"Encyclopedia of Polymer Science and Engineering", 2nd Edition, vol. 12, 1985, pp. 217 to 234.
Chemical Abstracts, Alpha Techno, "Rapid Curing 2-cyanoacrylate Adhesive Composition", vol. 111, No. 16, No. 135602d, Oct. 1989.
Chemical Abstracts, Sumitomi Electric, "Polyester Adhesive Compositions and Their Cure", vol. 114, No. 2, No. 7973a, Jan. 14, 1991.

Primary Examiner—Samuel A. Acquah
Attorney, Agent, or Firm—Eugene Zagarella, Jr.

[57] ABSTRACT

A cyanoacrylate adhesive composition having improved toughness comprising a cyanoacrylate monomer and an effective toughening amount of a polyester polymer derived from a dibasic aliphatic or aromatic carboxylic acid and a glycol and having repeating units of the structure:

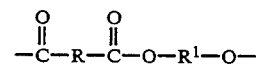

where R is the organic residue of the dibasic carboxylic acid and $R^1$ is the organic residue of the glycol, the polyester having a weight average molecular weight of greater than 10,000 and a Tg of from about −40° to 30° C.

6 Claims, No Drawings

TOUGHENED CYANOACRYLATE ADHESIVE COMPOSITION CONTAINING POLYESTER POLYMERS

This application is a continuation of application Ser. No. 07/749,354, filed Aug. 23, 1991, now abandoned.

BACKGROUND OF THE INVENTION

This invention relates to cyanoacrylate adhesive compositions which are improved in toughness by incorporation therein of selected polyester polymers.

Cyanoacrylate compositions are well known as excellent adhesives. Known advantages for these compositions are they can be used as a single component, are convenient and easy to use since they cure rapidly at room temperature without an external energy source and they have the ability to bond a wide variety of substrates making them useful in numerous bonding operations. Despite these attributes, cyanoacrylate adhesives do have their limitations and one primary shortcoming is in the area of impact resistance and toughness.

Attempts to change and improve the properties of cyanoacrylate compositions have included the addition of various thickeners, fillers, toughening agents and other modifiers and additives. U.S. Pat. No. 4,102,945 discloses a cyanoacrylate adhesive composition thickened by a copolymer or terpolymer resin capable of being dissolved or solvated by the cyanoacrylate monomer and resulting in significantly improved peel strength.

U.S. Pat. No. 4,105,715 discloses a cyanoacrylate adhesive composition which is made thixotropic by incorporating powdered organic fillers such as polycarbonate, polyvinylidene fluoride, polyethylene and acrylic block copolymer resins containing saturated elastomer segments.

U.S. Pat. No. 4,425,471 involves cyanoacrylate adhesive compositions containing an alkyl 2-cyanopenta-2,4-dienoate which have improved resistance to heat and water and exhibit suitable peel and impact strengths.

U.S. Pat. No. 4,440,910 discloses cyanoacrylate adhesive compositions containing elastomeric polymers such as acrylic rubbers as fillers and exhibit substantially increased toughness.

U.S. Pat. No. 4,560,723 discloses a cyanoacrylate adhesive composition containing a toughener such as a core-shell thermoplastic/rubber copolymer which is treated to remove impurities which cause premature polymerization of cyanoacrylates and a compatible organic compound having one or more aryl groups, such as diphenylmethane, to provide improved retention of peel strength and toughness.

SUMMARY OF THE INVENTION

The present invention provides cyanoacrylate adhesive compositions wherein selected high molecular weight, hydroxyl terminated, low Tg polyesters are added to provide improved impact resistance and toughness with good flexibility.

More particularly, this invention relates to cyanoacrylate adhesive compositions having improved toughness and comprising:
 a) a cyanoacrylate monomer; and
 b) an effective amount of a polyester polymer derived from a dibasic aliphatic or aromatic carboxylic acid and a glycol and having repeating units of the structure:

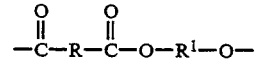

where R is the organic residue of the dibasic aliphatic or aromatic carboxylic acid and $R^1$ is the organic residue of the glycol, the polyester having a weight average molecular weight of greater than 10,000 and a Tg of from about $-40°$ to $+30°$ C.

DETAILED DESCRIPTION OF THE INVENTION

The advantages of this invention may be achieved with essentially all adhesive compositions based upon cyanoacrylate esters. More particularly, the esters have the formula:

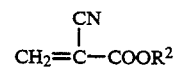

where $R^2$ represents a $C_{1-16}$ alkyl, cycloalkyl, alkenyl, cycloalkenyl, phenyl or heterocyclic (such as furfuryl) radical. The $R^2$ group can contain any substituents or linkages which do not adversely effect the monomer in the performance of its intended function in the cyanoacrylate adhesive composition. For purposes of this invention, the preferred monomers are those wherein $R^2$ is a $C_1$ to $C_6$ alkyl or alkenyl radical or a cyclohexyl radical. Most preferred are methyl and ethyl cyanoacrylates. The cyanoacrylate monomer can be used singly or in admixture.

Methods for preparing the above monomeric esters of 2-cyanoacrylic acid are well known in the art as, for example, described in U.S. Pat. Nos. 2,467,927 Ardis, issued Apr. 9, 1949 and 3,254,111 to Hawkins, et al., issued May 31, 1966.

The polyester polymers added to the cyanoacrylate adhesive compositions in accordance with this invention are polyesters derived from dibasic carboxylic acids and glycols. More particularly, the polyester polymers are derived from dibasic aliphatic or aromatic carboxylic acids and glycols and have repeating units characterized by the formula:

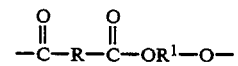

where R is the organic residue of the dibasic aliphatic or aromatic carboxylic acid and $R^1$ is the organic residue of the glycol, the polyester having a weight average molecular weight of greater than 10,000 and a Tg of from about $-40°$ to $30°$ C.

The polyester polymers used in this invention are generally formed from the esterification or condensation of dicarboxylic acids with dihydroxy alcohols. The dicarboxylic acid used in preparing the ester may be an aliphatic acid having 2 to 22 carbon atoms or an aromatic acid having 6 to 14 carbon atoms. More particularly the dicarboxylic acid will be a saturated, aliphatic acid, preferably containing 2 to 14 carbon atoms, and an aromatic acid, preferably containing 6 to 10 carbon atoms. These dicarboxylic acids may include the alicyclic or cycloaliphatic acids and also the anhydrides of such acids. Illustrative of the dicarboxylic acids which may be used include: adipic acid, azelaic acid, sebacic acid, succinic acid, dodecanoic acid, terephthalic acid, isophthalic acid and phthalic acid.

The dihydroxy alcohols or glycols which may be used in preparing the polyesters used in this invention are aliphatic diols having from 2 to 12 carbons and preferably saturated aliphatic diols having 2 to 5 carbon atoms. These aliphatic diols or glycols include the polyglycols having repeating units of respective glycols such as polyethylene glycol and polypropylene glycols. Also included as useful dihydroxy compounds are the saturated cycloaliphatic diols. Examples of such useful dihydroxy alcohols include: ethylene glycol, diethylene glycol, triethylene glycol, polyethylene glycol, propylene glycol, polypropylene glycol, 1,3-butanediol 1,4-butanediol 1,6-hexanediol 2,2-dimethyl 1,3-propanediol and 1,4-cyclohexane dimethanol.

The polyesters of this invention, as described above, may be modified by the incorporation therein of monocarboxylic acids, monohydroxy alcohols and even small amounts of polycarboxylic acids or polyhydroxy alcohols. It is preferred that these polyesters be hydroxy terminated, particularly when carbon black is used in the cyanoacrylate adhesive composition, since the hydroxy terminated polyester polymers help disperse the carbon black so that the resulting formulation exhibits improved impact strength and toughness.

The polyesters which are saturated and linear have a weight average molecular weight of greater than 10,000 preferably from about 30,000 to 60,000 and a glass transition temperature, Tg, of from about −40° to 30° C., preferably from about −30° to 15° C. The polyesters, many of which are commercially available, may be prepared using known procedures by esterification or condensation of selected dicarboxylic acids and dihydroxyl alcohols. Typical procedures are described in "Organic Polymer Chemistry" by K. K. Saunders, Chapman and Hall Ltd., 1973, pp. 203–244 and in "Encyclopedia of Polymer Science and Engineering," 2nd Edition, Vol. 12, 1985, pp. 217 to 234.

The polyesters are generally added to the adhesive in a solution prepared by dissolving the polyester in an appropriate solvent such as tetraglyme, toluene or 2,4-pentanedione at solids concentrations of 20 to 40%, by weight, preferably about 30% by weight.

The amount of polyester polymer added to the cyanoacrylate compositions will generally be an effective toughening amount and, more particularly, will comprise from about 0.1 to 10% by weight, based on the weight of cyanoacrylate, preferably from about 0.5 to 8% by weight.

Other known additives for use in cyanoacrylate adhesives, such as fillers, thickeners, anionic polymerization inhibitors, free radical stabilizers, pigments, dyes, adhesion promoters, heat resistant promoters, water resistance promoters, etc., may be included in the compositions of this invention. One additive which has been found particularly useful in these compositions is carbon black pigment. The types and amounts of such additives are well known to those skilled in the art.

The following examples are further illustrative of this invention and are not intended to be construed as limitations thereof. In the examples, all parts and percentages are by weight and all temperatures in degrees Celsius unless otherwise noted.

EXAMPLE I

Polyester polymers were prepared having the following composition and properties by combining the respective dicarboxylic acids and glycols:

| Component | Polyester Polymer (Mole %) | | |
|---|---|---|---|
| | A | B | C |
| azelaic acid | 24 | 18 | 24 |
| terephthalic acid | 16 | 32 | 14 |
| isophthalic acid | 10 | — | 12 |
| ethylene glycol | 50 | 23 | 50 |
| 2,2-dimethyl-1,3 propanediol | — | 27 | — |
| wt. no. molecular weight | 42,400 | 47,500 | 48,700 |
| Tg, °C. | −28 | 15 | −28 |

EXAMPLE II

A solution of polyester polymer A (30% by wt.) in tetraglyme was prepared and a pigment dispersion obtained by adding 25% by weight of carbon black pigment under high shear. An adhesive formulation was obtained by adding 5% by weight (solids) of the polyester dispersion to ethyl cyanoacrylate monomer.

EXAMPLE III

A solution of polyester polymer A in 2,4 pentanedione was prepared and a pigment dispersion obtained by adding 18% of carbon black under high shear mixing. An adhesive formulation was obtained by adding 10% by weight (solids) of the polyester dispersion to ethyl cyanoacrylate monomer.

EXAMPLE IV

A solution of polyester polymer A was prepared as in Example II using toluene as the solvent. The polyester was added at a level of 5% by weight (solids).

Adhesive properties were determined in accordance with ASTM D950-82 for impact resistance, D 1876-72 for T-peel (90° peel), D 903 for 180° peel adhesion test and D 1002-72 for lap shear test. The control formulation contained no polyester. For further comparison, a commercially available toughened cyanoacrylate adhesive (Loctite 410) was also tested. It is believed this product is prepared according to the teachings of U.S. Pat. No. 4,102,945.

| Adhesive | ADHESIVES PROPERTIES OF FORMULATED ADHESIVES | | | | |
|---|---|---|---|---|---|
| | Ex. II | Ex. III | Ex. IV | Control | '410 |
| Cyanoacrylate | Ethyl | Ethyl | Ethyl | Ethyl | Ethyl |
| Thickener | PMMA[1] | PMMA | PMMA | PMMA | Unknown |
| Additive | Polyester | Polyester | Polyester | — | Unknown |
| Additive Level | 5% | 10% | 5% | — | Unknown |
| Impact Resistance (Ft. Lbs/in$^2$ | 6.0 | 6.0 | 6.0 | 2.0 | 5.0 |
| Lap Shear After 2 min @ RT, psi | 1700 | 1600 | 1700 | 1400 | 260 |
| After 15 | 1900 | 1900 | 1900 | 2200 | 2400 |

-continued

| ADHESIVES PROPERTIES OF FORMULATED ADHESIVES | | | | | |
|---|---|---|---|---|---|
| Adhesive | Ex. II | Ex. III | Ex. IV | Control | '410 |
| min @ RT, psi | | | | | |
| After 24 hrs. @ RT, psi | 3500 | 3300 | 3300 | 2900 | 3500 |
| T-peel, Lbs/in | 5(CF) | 5(CF) | 5.0(CF) | 6.0(AF) | 4(CF) |
| 180° peel, Lbs/in | 11(CF) | 10(CF) | 15.0(CF) | 10.0(AF) | NA |

(1)polymethylmethacrylate
AF = Adhesive Failure
CF = Cohesive Failure

These results shown the improved toughness properties, evidenced especially by impact resistance, for the polyester containing cyanoacrylate adhesive formulation. Similar results should be obtained using other polyester compositions meeting the molecular weight and Tg requirements described herein including those polyesters designated "B" and "C" in Example I.

What is claimed is:

1. A cyanoacrylate adhesive composition having improved toughness and flexibility and consisting essentially of:
   a) a cyanoacrylate monomer; and
   b) an effective toughening amount of a saturated, hydroxy terminated polyester polymer derived from a dibasic aliphatic or aromatic carboxylic acid and a glycol and having repeating units of the structure:

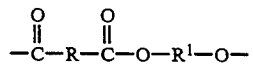

where R is the organic residual of the dibasic carboxylic acid and $R^1$ is the organic residue of the glycol, the polyester having a weight average molecular weight of from about 30,000 to 60,000 and a Tg of from about −40° to 30° C.

2. The composition of claim 1 wherein from about 0.1 to 10% by weight of said polyester is used.

3. The composition of claim 2 wherein R is an organic residue of an aliphatic acid having 2 to 22 carbon atoms or an aromatic acid having 6 to 14 carbon atoms and $R^1$ is the organic residue of a glycol comprising an aliphatic diol of 2 to 12 carbon atoms or a polyglycol comprising repeating units of an aliphatic diol of 2 to 12 carbon atoms 4. The composition of claim 3 wherein the polyester has a Tg of from about −30° to 15° C.

5. The composition of claim 4 wherein the cyanoacrylate is methyl cyanoacrylate or ethyl cyanoacrylate.

6. The composition of claim 5 which contains a carbon black pigment.

* * * * *